July 22, 1958  S. A. AANNERUD  2,844,533
ELECTROLYTE LEVEL CONTROL ARRANGEMENT IN ELECTROLYTIC CELLS
Filed May 20, 1954
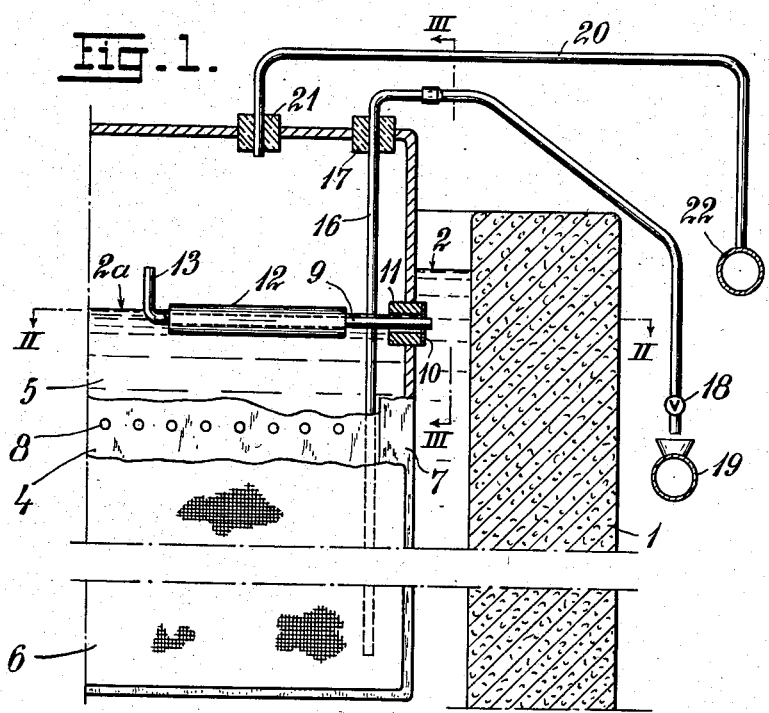
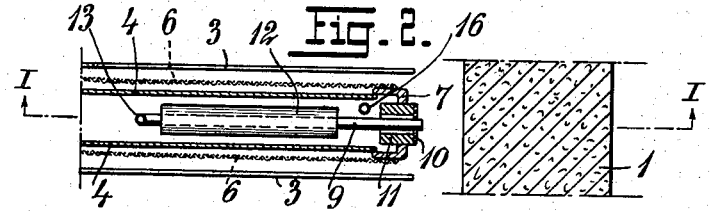
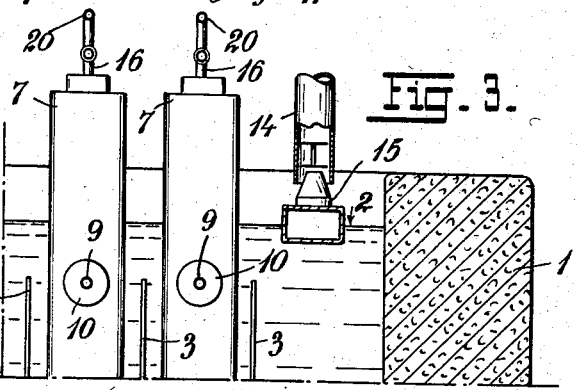
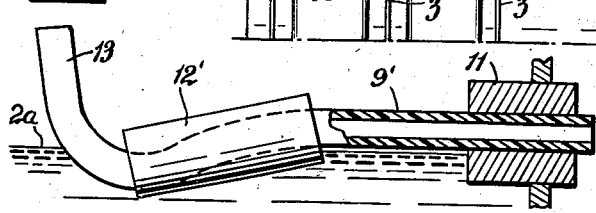
INVENTOR
SIGURD ARTHUR AANNERUD
BY
ATTORNEYS

United States Patent Office 2,844,533
Patented July 22, 1958

2,844,533

ELECTROLYTE LEVEL CONTROL ARRANGEMENT IN ELECTROLYTIC CELLS

Sigurd Arthur Aannerud, Thamshavn, Norway, assignor to Pyror Limited, Pembroke, Bermuda, a corporation of Bermuda Application May 20, 1954, Serial No. 431,199

Claims priority, application Norway May 20, 1953

7 Claims. (Cl. 204—257)

In electrolytic cells in which there occurs a continuous flow of liquid through diaphragm separating the anode space from the cathode space, by continuously supplying liquid to one side of the diaphragm and discharging liquid from the other side, it is often difficult to keep the liquid flow through the diaphragm constant. The reason for this fact, which is particularly pronounced in processes requiring very dense diaphragm cloths, for example in the electrolysis of iron, cobalt, copper and other metal salt solutions, is that since under various conditions dependent on current density, concentrations, depositions etc. the diaphragm may be of varying density and thus afford a varying resistance to flow of liquid therethrough. These variations in flow may be highly undesirable, for if the liquid level on the outlet side drops too far, neither the anode nor the cathode face is wholly utilized, and an excessive current density and consequent drawbacks result.

The present invention has for an object to overcome the disadvantage referred to and in the first place consists in that from the liquid space on the inlet side to the outlet side of the diaphragm there is provided a passage by-passing the liquid current through the diaphragm and provided with a level control device, which dependent on the difference in level between the inlet and the outlet side of the diaphragm acts on the liquid flow through the bypass passage so as to keep the said difference in level substantially constant.

By thus permitting a constant level difference between inlet and outlet side to be maintained in the electrolytic vessel it is easily possible to avoid undesirable level drops at the outlet side, the bypass conduit compensating for reduced flow through the diaphragm and thereby maintaining a balance with the discharge if only the level at the inlet side is kept constant, which does not constitute any problem.

The invention will be illustrated in more detail having reference to the drawings, which show a convenient embodiment of the arrangement according to the invention.

Fig. 1 is a view in elevation and partial longitudinal section of a portion of a double electrode as well as a cross-sectional view of a part of an adjacent wall of the electrolytic vessel. The section is taken along the line I—I in Fig. 2.

Fig. 2 is a corresponding view in horizontal section along the line II—II in Fig. 1.

Fig. 3 is a view in end elevation and partly in section taken along the line III—III of Fig. 1.

Fig. 4 is a view similar to Fig. 1 but showing only a portion of the electrolytic vessel and the manner in which a flexible tube is mounted in the wall of the anode frame.

In the embodiment shown the arrangement to the invention may for example be assumed to be used in connection with an electrolysis of dilute $FeSO_4$ solution where the iron is deposited at the cathode, while $SO_4$ ions are passing through a diaphragm so as to deliver their load to the anode and form sulphuric acid while giving off gaseous oxygen. Thus, in this case the catholyte consists of $FeSO_4$ solution and is assumed to be introduced continuously into the electrolytic vessel 1, in which it adopts a surface level 2, which can be kept constant for example by an overflow means in connection with a circulation path or if desired by means of a float-controlled valve as illustrated in Fig. 3 which shows a float controlled valve 15 controlling the supply of electrolyte from a pipe 14. In Fig. 2 3, 3 designate two adjacent starting cathodes for the iron deposition, while 4, 4 designate a pair of anode plates, for example of lead, each cooperating with one of the cathodes 3 and confining between them a supply space for anolyte 5. One diaphragm 6 for example of heat-shrunk vinyl-chloride-acrylonitrile cloth (see United States Patent No. 2,667,455) extends at the outside of each anode plate 4, and both anode plates with appurtenant diaphragm are supported by an anode 7 of U-section, which together with the diaphragm enclose the anode space. The intermediate space between each anode plate and appurtenant diaphragm communicates with the interior anode space 5, for example by holes 8 in the anode plates at the top as indicated in Fig. 1, and if desired also by openings at the bottom, for example as described in United States Patent No. 2,691,628 issued to the inventor of this invention with a view to creating a circulating flow of anolyte. As described in this latter specification and as indicated in Fig. 3 alternate separating cathodes 3 and double anodes may be placed side by side in the vessel 1 in the conventional manner. Gas such as oxygen produced by the electrolysis is withdrawn from the top of each anode space above the anolyte 5 through a pipe 20 passing through a sealing gasket 21 in the top of the anode-frame 7 and communicating with a common collecting pipe 22.

From each anode space 5 anolyte is withdrawn continuously for example by means of a siphon 16 passing through a sealing gasket 17 in the top of the anode-frame 7 and discharging through an adjusting valve 18 outside the vessel 1 and at a lower level into a common collecting pipe 19 and the anolyte in the anode space thereby adopts a level $2a$ at which the flow of liquid through the diaphragm 6 is in balance with the discharge and which is somewhat lower than the surface level 2 of the catholyte. In order to maintain the level $2a$ constant, according to the present invention there is now provided a bypass conduit to the diaphragm, consisting of a small tube 9 for example of glass, which enters through the marginal wall of the anode space, i. e. the base portion of the vertical frame member 7 shown, and which at its outer extremity is supported tightly and movably by a rubber membrane 10 on a sleeve 11 inserted in the marginal wall. The tube 9 is placed in a small glass float 12 which floats on the anolyte and in the case of a normal anolyte level $2a$ keeps the tube in a position in which the discharge end of the upwardly bent inner end portion 13 thereof is flush with level 2 or slightly higher.

Thus, under normal conditions no catholyte will flow in through the tube 9, but the latter will be filled with catholyte practically to the mouth. If now the anolyte in the space 5 drops consequent to a reduced flow through the diaphragm 6, the float 12 will sink, so that the tube mouth comes below the catholyte level 2 and thereby forms an overflow for catholyte into the anode space until the liquid level in the latter is again normal.

It will be understood that the amount of catholyte entering through the tube 9 will comparatively be so small that the variation caused thereby in the composition of the anolyte will be without any practical importance. On the other hand due to the automatic level control achieved it is made possible to carry out the electrolysis continuously without frequent inspection of the individual anode spaces, which otherwise is often necessary.

Proceeding next to Figure 4, there is illustrated a modification of the above described invention wherein a flexible tube 9' having a float 12' is tightly inserted in a corresponding orifice in the anode frame 7 instead of being mounted in a separate membrane 10. Thus, instead of being fixed in a flexible member, the tube itself is flexed between the float and electrode frame.

It will be understood that the invention is adaptable also for other electrolytic processes than the iron electrolysis referred to, and likewise that the invention may be carried out in other ways than that shown and described. Thus, it will be possible to dispense with the membrane 10 if the tube 9 is made of material having a certain elastic resiliency, for example an elastic, acid-proof plastic. Further, for example instead of using a movable tube as a bypass conduit it is possible to use a stationary tube extending into the space on the outlet side of the diaphragm at a level between the liquid levels on both sides of the diaphragm and having a downwardly bent outlet projecting into a floating cup, the upper edge of which forms an overflow to the liquid on the outlet side.

I claim:

1. In an electrolytic cell having a partition comprising a diaphragm between anode and cathode spaces and with a liquid inlet on one side of the partition and a liquid outlet on the other, one of said spaces thus constituting an inlet space and the other an outlet space, tubular means mounted in said partition and extending from said inlet space to said outlet space, and level controlled flow control means on said tubular means in said outlet side responsive to the difference in level between the inlet side and the outlet side for so controlling flow of liquid through said tubular means to the outlet side as to compensate for deficiencies in liquid supply to said outlet space through said diaphragm with respect to liquid discharge from said outlet space through said outlet so as to keep said level difference approximately constant.

2. An electrolytic cell as claimed in claim 1 with said tubular means having an overflow on the outlet side thereof through which liquid is discharged, and a float on said tubular means to maintain said overflow at a vertical distance above the liquid level on the outlet side substantially equal to a predetermined difference in levels between the inlet and outlet sides.

3. An electrolytic cell as claimed in claim 2 wherein an electrode structure forming part of said partition is mounted therein, flexible means mounted in a wall of said electrode structure, said flexible means having an aperture therethrough, and said tubular means being tightly received within said aperture.

4. An electrolytic cell as claimed in claim 2 with said tubular means formed of a flexible material and thereby being responsive to the variation in the difference in said outlet and inlet levels.

5. An electrolytic cell as claimed in claim 2 wherein said tubular means has one end movably mounted in the partition and projects into the outlet space of the cell.

6. An electrolytic cell as claimed in claim 2, wherein an electrode is located on the outlet side of said diaphragm, said electrode permitting liquid communication between opposite sides thereof, said tubular means extending from the inlet side of said partition to the outlet side of the electrode and said flow control means being positioned by the level of the liquid on the outlet side of the electrode.

7. An electrolytic cell as claimed in claim 1, wherein an electrode structure is mounted therein, said electrode structure comprising a pair of vertical plates defining a chamber therebetween from which said liquid outlet extends, but permitting liquid communication between said outside of said structure and said chamber, said structure further comprising an end wall for said chamber, said end wall also forming part of said partition and said tubular means extending into said chamber through said end wall.

References Cited in the file of this patent

UNITED STATES PATENTS

| | | |
|---|---|---|
| 1,191,356 | Smith | July 18, 1916 |
| 1,389,829 | Heberlein | Sept. 6, 1921 |
| 1,426,071 | Haglund | Aug. 15, 1922 |
| 1,477,512 | McKee | Dec. 11, 1923 |
| 1,949,467 | Gerth | Mar. 6, 1934 |